United States Patent [19]

Winter et al.

[11] 4,147,090
[45] Apr. 3, 1979

[54] APPARATUS FOR SUPPORTING A SHAVING TOOL IN AN ADJUSTABLE TOOL HOLDER FOR MULTIPLE GAUGE STRIP DRAW SHAVING

[75] Inventors: Joseph Winter, New Haven; Eugene Shapiro, Hamden; Warren F. Smith, Branford, all of Conn.

[73] Assignee: Olin Corporation, New Haven, Conn.

[21] Appl. No.: 829,908

[22] Filed: Sep. 1, 1977

[51] Int. Cl.² .............................................. B23D 1/00
[52] U.S. Cl. .................................. 90/24 R; 33/185 R
[58] Field of Search .............. 90/24 R, 24 F, 52, 34 R, 90/38 R, 11 C, 11 R, 16; 33/185 R; 83/5

[56] References Cited

U.S. PATENT DOCUMENTS

| 218,249 | 8/1879 | Fields | 90/24 R |
|---|---|---|---|
| 3,481,247 | 12/1969 | Hayes | 33/185 |
| 3,538,812 | 11/1970 | Morel | 90/16 |
| 3,865,012 | 2/1975 | Laigle | 90/24 F |
| 3,992,977 | 11/1976 | Winter et al. | 90/24 R |

FOREIGN PATENT DOCUMENTS 2457565  6/1976  Fed. Rep. of Germany .......... 90/24 R

*Primary Examiner*—Gil Weidenfeld
*Attorney, Agent, or Firm*—Paul Weinstein

[57] ABSTRACT

An improved method and apparatus for supporting the shaving tool in an adjustable tool holder for use in the production of multiple gauge strip is disclosed wherein the adjustable tool holder is vertically positioned on gauge blocks and thereby rigidly supported against the strip to be shaved by applying a vertical load on the adjustable tool holder.

9 Claims, 4 Drawing Figures

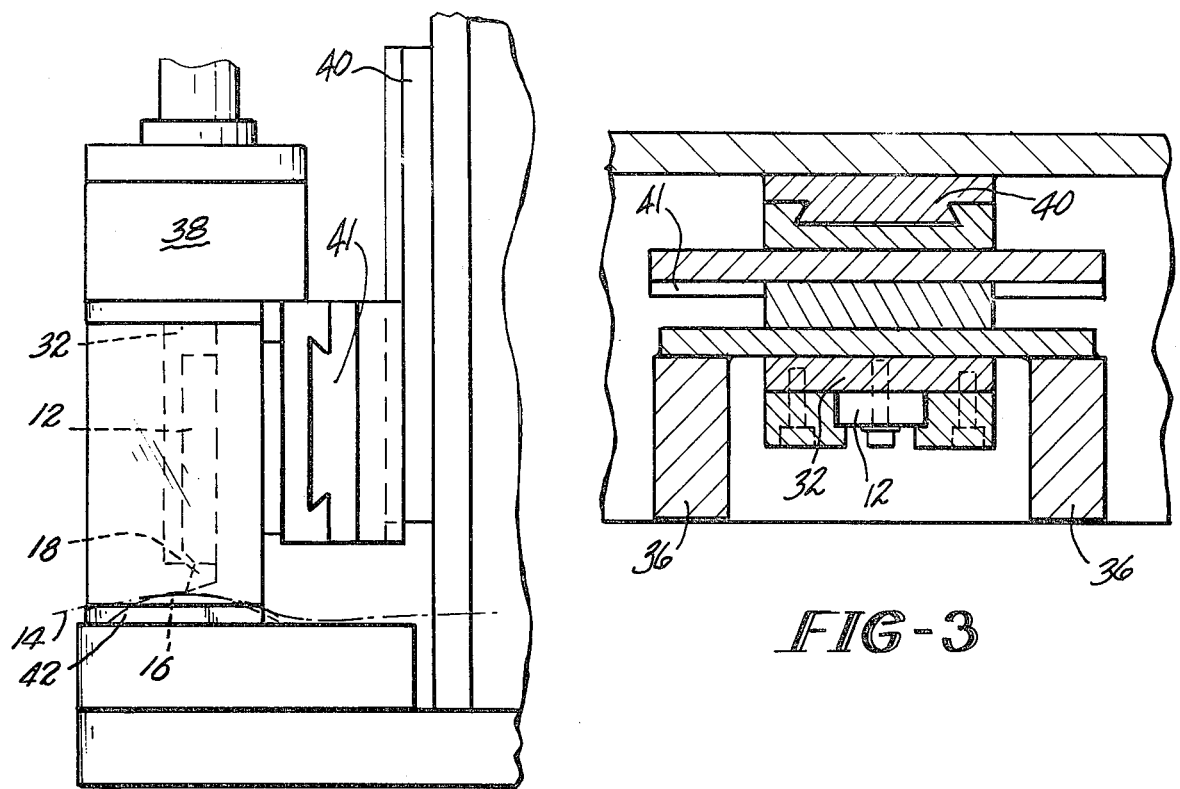
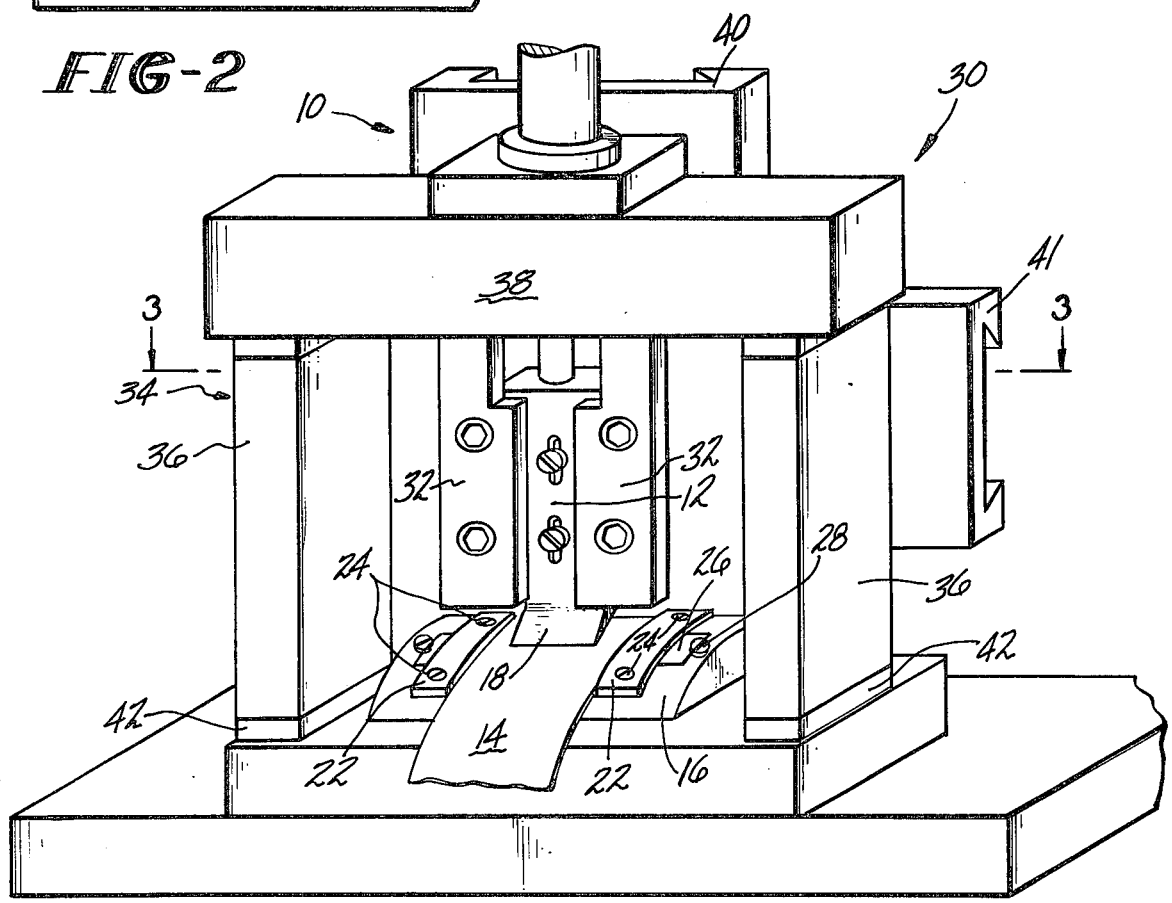

APPARATUS FOR SUPPORTING A SHAVING TOOL IN AN ADJUSTABLE TOOL HOLDER FOR MULTIPLE GAUGE STRIP DRAW SHAVING

BACKGROUND OF THE INVENTION

The invention relates to a method and apparatus for the preparation of multiple gauge metal strip by a shaving operation wherein the strip is drawn through the shaving apparatus over an arced surface.

It is necessary to provide a multiple gauge thickness in a metal strip in many applications such as the production of copper strip for the formation of electrical conductors and the like. Conventional procedures such as continuous milling have been employed to produce the desired variations in gauge, however, such processes suffer from the disadvantages of being both time consuming as well as generating an unfavorable form of scrap.

An additional procedure which has been known in the art to produce multiple gauge metal strip comprises the reduction to gauge by a rolling operation. However, the rolling operation in the production of multiple gauge strip has been found to suffer from the disadvantages of being restricted to certain shapes, and furthermore tend to involve complex and costly tooling. Additionally, it has been found that the product produced by the aforesaid rolling process fails to meet commercial tolerances as well as being free from other structural defects.

A further method of producing multiple gauge metal strip is by a drawing process. However, certain complications resulted from this process. In the normal drawing process reduction of the thickness in a section results in an increase in section length so that if the thickness of a given shape varies across its width, the drawing process will result in variable changes in length causing non-uniform metal flow and stresses leading to buckling, twisting, tearing and fracture of the workpiece. Though a wide variety of drawing techniques are known, including the employment of the hydrodynamic principle, none have been suggested or would appear to alleviate the aforenoted deficiencies associated with the drawing of complex multiple gauge configurations.

The technique of shaving as a form of metal reduction has been known in the art for some time. However, its application has been generally limited to the finishing of materials of uniform cross section by the reduction of the cross sectional area of the workpiece, with the reduction being conducted along the entire surface thereof. This technique is illustrated in U.S. Pat. No. 3,055,102 to Shaw et al. wherein a shaving tool is applied against a rod or bar which reduces the cross sectional area along the entire surface thereof.

Certain problems would appear to arise if this shaving technique exemplified by Shaw et al. were to be directly applied to the production of multiple gauge strip products from rectangular stock. Specifically, the application of shaving force against only a portion of the totol surface of the strip tends to magnify the problems set forth in the aforenoted patent, particularly, the inability to hold the workpiece properly centered with respect to the tool with the result that the workpiece wanders and a wavy or broken surface may result. A further difficulty which would arise and be magnified by the removal of stock from only a portion of the workpiece surface would be the excessive chattering that takes place as the strip would pass through the tool which would appear on the finished product as a torn or galled surface.

One known method of producing multiple gauge strip by draw shaving is illustrated in U.S. Pat. No. 3,992,977 to Winter et al. and assigned to the assignee of the present invention and incorporated herein by reference. The method and apparatus for producing multiple gauge metal strip in the aforesaid U.S. Patent while found to be superior to previously known methods still was found to suffer from deficiencies. More particularly, the rake angle at which the tool was disposed was found to be limited to a range of $2\frac{1}{2}°$ to about 25° and was preferably about 5° to 18°. Any increase in rake angle above those critical values would cause the workpiece to ride up the tool resulting in excessive strip material being removed. Thus, as a result of the limit on rake angle, the amount of volume removed per pass was also limited. Furthermore, the manner in which the tool was held in position with respect to the anvil and strip was found to produce chatter marks on the shaved portion of the multiple strip product not unlike those chatter marks encountered in the aforesaid machining operations. The chatter marks are undesirable for functional reasons as well as cosmetic reasons. Chatter marks on the metal strip impedes the bonding of semiconductor chips to the strip as well as inhibiting the metal plating of the strip which may be necessary in the production of electrical conductors and the like. The shaved gauge variation of the strip was found to be ±0.002" while variations in the transverse positioning of the cut groove were 0.005". Finally, the finished multiple gauge strip product was observed to have significant scratching on the backside thereof as a result of being drawn over the flat anvil during the shaving process. Furthermore, the shape of the final product exhibited an increase in cross-wise dish with a corresponding increase in cut depth and/or width. This cross-wise dish can be attributed to the insufficient hold-down forces of the strip against the flat anvil.

SUMMARY OF THE INVENTION

In accordance with the present invention, it has been found that a shaving operation for the production of multiple gauge strip products may be conducted wherein the strip is drawn through the shaving apparatus over an arced surface thereby allowing an increase in rake angle while at the same time minimizing cross-wise dish in the final product. The improved apparatus of the present invention includes an improved support structure for rigidly fixing the cutting tool's position with respect to the arced surface and strip thereby improving shaved gauge tolerances while reducing chatter marks.

The features of the present invention comprise the provision of an arced surface of polished carbide which eliminates backside scratches and thereby not only improves the cosmetic qualities of the multiple gauge strip product but also reduces the shaving stresses. The employment of an arced surface allows the tool's rake angle to be increased to a range of from 20° to about 45° thereby resulting in a corresponding decrease in relative shaving stress. Since the shaving stress is directly related to the volume of material which can be removed per pass without exceeding the yield strength of the material, the increase in rake angle allows greater volume removal per pass. Furthermore, with an arced surface, the strip can be caused to wrap around the surface thereby providing effective hold-down of the strip against the surface, this ability to wrap around the surface results in a reduction in cross-wise dish. By providing strip guides on the arced surface, the width variations of the shaved surface are improved.

A further feature of this invention contemplates an improved support component for rigidly fixing the tool's position with respect to the arced surface and strip thereby eliminating chatter marks while improving gauge depth tolerances.

The method of this invention possesses certain advantages over conventional milling procedures in that scrap retrieval is made easier as the removed stock is usually obtained in the form of a long continuous coil whereas the scrap generated by conventional milling is in discontinuous chips of random shapes and sizes. The method of the present invention also exhibits advantages over previously known draw shaving processes for multiple gauge strip in that the tolerances of the shaved surface are improved, cross-wise dish is minimized, backside scratching is greatly eliminated, and by the increase in allowable rake angle of the tool the volume of material capable of being removed per pass is greatly increased.

It is, accordingly, a principal object of the present invention to produce an improved method for the manufacture of multiple gauge metal strip products which employs an improved shaving operation.

It is another object of the present invention to provide a method and apparatus as aforesaid which will increase the volume of metal removal per pass.

It is a further object of the present invention to provide an apparatus for the performance of the shaving method as aforesaid which improves the tolerances obtained in the shaved surface of the multiple gauge metal strip.

Still another object of the present invention is to produce a multiple gauge metal strip in which chatter marks are greatly reduced.

Other objects and advantages will become apparent by those skilled in the art from a consideration of the description which proceeds with reference to the following drawings.

BRIEF DESCRIPTION OF THE DRAWINGS

FIG. 1 is a perspective view of a shaving apparatus employed in accordance with the invention;

FIG. 2 is a side view of the apparatus shown in FIG. 1;

FIG. 3 is a sectional view taken along line 3—3 in FIG. 1; and

DETAILED DESCRIPTION

Figure 4:
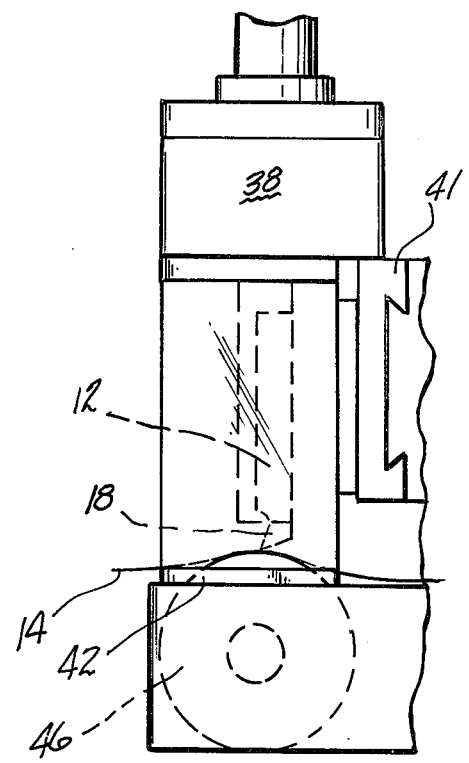
FIG. 4 is a partial side view of a further embodiment of shaving apparatus used in accordance with the invention.

In accordance with the present invention, the foregoing objects and advantages are readily obtained.

Shaving is a metal removal process akin to machining or broaching, and utilizes a stationary cutting tool and a moving workpiece. As in any cutting operation, such variables as speed, tool geometry, stock removal and lubrication are important, however, unlike most metal cutting, the amount of stock removal achieved in a shaving operation is controlled by the maximum force which can be exerted on the strip before yielding occurs. Essentially, this is the same kind of restraint imposed on a wire drawing operation. The limiting force is, therefore, equal to the yield strength of the strip multiplied by the strip cross sectional area after shaving. This may be expressed as follows:

$$F_{max} = Y.S.(A_F)$$

Where, $F_{max}$ is the limited force;
Y.S. is the yield strength; and
$A_F$ is the strip cross sectional area after shaving.

Another relationship observed is that the force required to remove a given cross sectional area of strip by a shaving operation is equal to the cross sectional area of the shaving cut multiplied by a machining or shaving constant, C. This relationship may be expressed as an equation which, when solved for C, is as follows:

$$C = F/A_r$$

Where,

F is the drawing force;
$A_r$ is the cross sectional area removed by shaving; and
C is the shaving constant.

It has been found in accordance with this invention that the successful preparation of multiple gauge strip may be accomplished by a shaving operation if the maximum amount of metal removal per shaving pass is determined in relation to the yield strength of the strip and the shaving constant, C, determined above. This relationship is inferred from the observation that, as the drawing force is increased, a maximum force is ultimately reached which corresponds to the yield strength of the strip. Thus, at this point $F = F_{max}$, and, by substitution the following expression is derived:

$$\text{Maximum Stock Removal (\%)}: \frac{A_r}{A_o} = \frac{1}{1 + \frac{C}{Y.S.}}$$

Where, $A_o$ is the initial cross sectional area of the strip;
$A_r$ is the cross sectional area removed by shaving;
C is the shaving constant; and
Y.S. is the yield strength of the strip.

Thus, by the above equation the maximum stock removal per pass by shaving may be calculated by determining the shaving constant and the yield strength of the strip. The shaving constant can be calculated from experimental measurements of drawing force which may then be substituted into the expression $C = F/A_r$, set forth earlier. The yield strength of the strip is determined by normal tensile testing methods such as the 0.2% offset yield strength method which was used herein.

Upon determining the maximum stock removal in accordance with the procedures set forth above, the shaving apparatus can then be adjusted so as not to exceed the maximum value. Such an adjustment will, of course, vary with the nature of the apparatus employed. For example, in the present invention, the apparatus for adjusting tool depth comprises an upside down U-shaped housing which is positioned on readily replaceable gauge blocks. Adjustment of tool depth is made by employing various size gauge blocks.

Another conventional parameter which influences the successful practice of the shaving method of this invention is the determination of the shaving tool rake angle. The rake angle is defined as the angle which the plane of the vertical leading surface of the tool defines with respect to the imaginary vertical plane perpendicular to the direction of strip travel. In cutting operations such as the method of this invention, it is usually found that a certain critical rake angle exists which, if exceeded, results in a loss of control of the thickness of the finished workpiece. Usually, a rake angle in excess of the critical value causes the workpiece to ride up the tool, with the result that excessive stock is removed.

The shaving apparatus employed in accordance with the present invention comprises an adjustable shaving tool provided with a cutting edge defining a pattern corresponding to the multiple gauge surface desired in the final strip product. The shaving tool is horizontally and vertically adjustable to enable shaving to be conducted to successfully achieve maximum possible strip reductions measured primarily in terms of volume removal. As noted above, maximum volume removal per shaving pass may be generally determined in relation to the yield strength of the strip and then coordinated with the cross sectional configuration of the desired end product. This being done, the apparatus is then appropriately adjusted to achieve the extent of volume removal desired. The various embodiments of the apparatus employed in the present invention will be described in greater detail hereinbelow.

Referring to FIG. 1, a shaving apparatus used in accordance with the present invention is illustrated in perspective. The apparatus 10 comprises a shaving tool 12 located adjacent and on a metal strip 14 which is being drawn across arced anvil 16. The cutting edge 18 of the shaving tool 12 contacts strip 14 at the top region of anvil 16, as shown in the drawings, and defines a cutting pattern whose configuration serves as the template for the final configuration of the multiple gauge strip product. Attached to the arced anvil 16 for guiding the metal strip 14 are a pair of strip guides 22 which are symmetrically positioned about the center line of the polygauge strip and spaced apart from each other the width of strip 14. The guides 22 are securely fixed to the anvil 16 by means of bolts 24 or other suitable means. The strip guides should be manufactured of a wear resistant material such as high speed tool steel so as to limit wear which may occur because of the relative motion between the strip 14 and the guides 22. The arced anvil 16 may be provided with a polished carbide insert 26 under the contact area of the tool which is secured by bolts 28 as well as by strip guides 22. The carbide insert may be secured to the anvil by other means such as brazing, adhesives or the like. Alternately, the arced anvil itself could be made of polished carbide. The radius of curvature of the arced anvil is limited on the high side by the ability to get the desired downward tensile force while minimizing total contact length and on the low side by the tendency to plastically deform the strip as it is drawn in tension over the anvil. It has been found that a radius of curvature from about 1 to about 12" is satisfactory, preferably from about 2 to 8".

As shown in FIG. 1, the shaving tool 12 is supported by and secured to an adjustable tool holder 30 comprising tool support structure 32 which is secured to vertically adjustable housing 34. Housing 34 is an upside down U-shaped structure comprising vertical legs 36 which are integral with connecting horizontal member 38. Shaving tool 12 is secured in the manner shown by support structure 32 which in turn is integral with the U-shaped housing 34 so as to allow the entire adjustable tool holder assembly 30 to move vertically as a whole.

The adjustable tool holder assembly 30 is adapted for horizontal and vertical movement on tracks 40 and 41 in any convenient manner known in the prior art for example, a screw travel slide connection, a sliding jack arrangement, by manual means, or any other suitable means. The adjustable tool holder assembly 30 rests on gauge blocks 42 which are readily capable of being replaced by gauge blocks of varying thicknesses. The tool holder assembly 30 is held in its appropriate vertical position against the gauge blocks 42 by providing an appropriate vertical load on the horizontal member 38. This vertical load may be in the form of simple weights or alternately hydraulic, pneumatic, or other suitable means for insuring that the assembly remains rigidly fixed with respect to the anvil and strip. As is clear, fine adjustments of the vertical position can be made by replacing the gauge blocks with other gauge blocks of suitable dimensions.

As stated above, maximum stock removal is determined with respect to the yield strength of the strip and the particular configuration desired. In addition to the aforenoted adjustments of the vertical position of the shaving tool, a further critical adjustment is made which relates to the rake angle of the tool edge. The rake angle is defined as the angle which the plane of the vertical leading surface of the tool defines with respect to the imaginary vertical plane perpendicular to the direction of strip travel. In accordance with the present invention, it has been found that the critical rake angle at which the cutting tool may be disposed is greatly increased over that of U.S. Pat. No. 3,992,977. The rake angle found to be useful in the aforesaid U.S. patent was from about 2½° to about 25° and preferably from about 5° to about 18°. In the present invention, it has been found that as a result of the employment of an arced anvil, a rake angle as high as 45° may be employed without causing the strip to ride up the cutting tool. This increase in rake angle is attributed to an increase in effective hold-down of the strip against the anvil as a result of the anvil being arced which causes the strip to wrap around said anvil. In addition, the employment of bridle rolls (not shown) ahead of and behind the arced anvil surface may also be used to thereby provide additional hold-down forces of the strip against the anvil. Increasing the tool's rake angle from the previously defined range, as indicated in U.S. Pat. No. 3,992,977, to that range which is capable of being attained in the present invention results in a reduced shaving stress and improved strip cosmetics. The improvement in the shaved surface finish results from the fact that an increase in rake angle results in a corresponding decrease of the built-up material adjacent to the tool's face. Increasing the rake angle also results in substantial reductions in shaving stress and consequently, a greater amount of material can be removed per pass than was previously possible.

The improved adjustable tool holder assembly results in improved shaved gauge tolerances over those realized in aforesaid U.S. Pat. No. 3,992,977, as a result of the use of a vertically loaded tool holder against precision machined gauge blocks and rigidly fixing the position of the anvil, strip and tool with respect to each other by applying said vertical load. The shaved gauge variation was reduced from ±0.002", as stated in the aforesaid patent, to ±0.0005". In addition, the employment of strip guides on the anvil has allowed variations in the transverse positioning of the cut groove to be reduced from 0.005" to 0.001". In addition, providing a polished carbide anvil or insert therefor, backside scratches of the polygauge strip were substantially reduced from that of the previously known method while correspondingly effecting a reduction in shaving stress.

The totality of the modifications of the present invention, i.e., increasing tool rigidity, providing an arced anvil, strip guides, and polished carbide inserts, results in improved surface finish of the shaved portion, reduced backside scratching, elimination of chatter marks on the shaved portion, and improved shaving efficiencies by allowing a greater removal of material per pass.

While the above shaving apparatus has been employed with an arced anvil 16 (FIGS. 1 and 2), it should be appreciated that a freely rotating wheel 46 (FIG. 4) may be substituted for the arced anvil and still effect the improvements of the present invention. In addition, the employment of a freely rotating wheel would tend to reduce frictional contact between the metal strip and the corresponding arced surface. Again, bridle rolls ahead of and trailing the rotating wheel will allow the strip to more effectively wrap around the wheel and thereby provide better hold-down of the strip thereon.

The following example is presented in order to gain a fuller understanding of the method and apparatus of this invention and to illustrate the advantages obtained therefrom. The example is presented for the purpose of illustration only and should not be construed as a limitation on the invention.

Five samples of ⅛ hard CDA Alloy 128 where prepared for draw shaving. An apparatus was employed for the draw shaving which comprised a shaving tool in accordance with the present invention. The alloy samples comprised flat ribbons of strip measuring 0.906" by 0.080". The 0.2% yield strength of the material was 22 ksi while the ultimate tensile strength was 36 ksi. The cutting tool width was 0.062" and the tool was set to cut a shaving depth of 0.007". Five samples were shaved in accordance with the present invention with the cutting tool set at a rake angle varying from 8° to 44°. The radius of the arced anvil was 3". The drawing force, F, was measured for each test and the relative shaving stress was calculated using the aforenoted formula. The results of the experiment are set forth below in Table I.

TABLE I

| Rake Angle (Degrees) | Relative Shaving Stress (ksi) |
|---|---|
| 8 | 1200 |
| 20 | 850 |
| 28 | 650 |
| 36 | 450 |
| 44 | 400 |

Based on the data in Table I, and the mathematical relationship between percent stock removed and shaving stress, it can be seen that a product fabricated with three passes using an 8° rake angle tool would only require one pass if the rake angle of the tool was set at 44°. As noted previously, this effective increase in allowable rake angle is directly attributed to the excellent hold-down force on the strip which occurs as the result of the employment of an arced surface over which the strip passes.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. Apparatus for the production of multigauge strip material comprising a tool holder assembly, said tool holder assembly including a horizontal member having speed vertical legs depending therefrom, a shaving tool having an elongated cutting edge, said shaving tool being located between said legs and being supported by said tool holder assembly, a base, an anvil having an arced surface supported on said base, said tool holder assembly being supported on said base and said shaving tool being located opposed to and adjacent the arced surface of said anvil, means for vertically adjusting and maintaining said tool holder assembly at a predetermined height to provide a desired shaving gap between the cutting edge of said shaving tool and the arced surface of said anvil, whereby a predetermined gauge of metal strip can be shaved from a thicker strip drawn between the anvil and the shaving tool.

2. Apparatus according to claim 1 wherein said arced surface is stationary.

3. Apparatus according to claim 1 wherein said arced surface is rotatable.

4. Apparatus according to claim 1 wherein said anvil has a surface of carbide.

5. Apparatus according to claim 1 wherein said arced anvil has strip guides secured thereto.

6. Apparatus according to claim 1 wherein said tool has a rake angle of about 2½° to about 45°.

7. Apparatus according to claim 1 wherein said adjusting and maintaining means include at least one gauge block of selected height seated between each leg of said assembly and said base.

8. Apparatus according to claim 7 wherein said adjusting and maintaining means include means for applying a vertical downward force to the assembly.

9. Apparatus according to claim 8 wherein the vertical force is caused by fluid pressure means.

* * * * *

UNITED STATES PATENT AND TRADEMARK OFFICE
CERTIFICATE OF CORRECTION

PATENT NO. : 4,147,090
DATED : April 3, 1979
INVENTOR(S) : Joseph Winter, Eugene Shapiro and Warren F. Smith It is certified that error appears in the above—identified patent and that said Letters Patent is hereby corrected as shown below:

In Column 1, line 59, the word "totol" should read ---total---.

In Column 7, line 29, the word "where" should read ---were---.

In Column 8, line 21, the word "speed" should read ---spaced---.

Signed and Sealed this

Seventh Day of September 1982

[SEAL]

Attest:

Attesting Officer

GERALD J. MOSSINGHOFF
Commissioner of Patents and Trademarks